United States Patent Office 3,449,941
Patented June 17, 1969

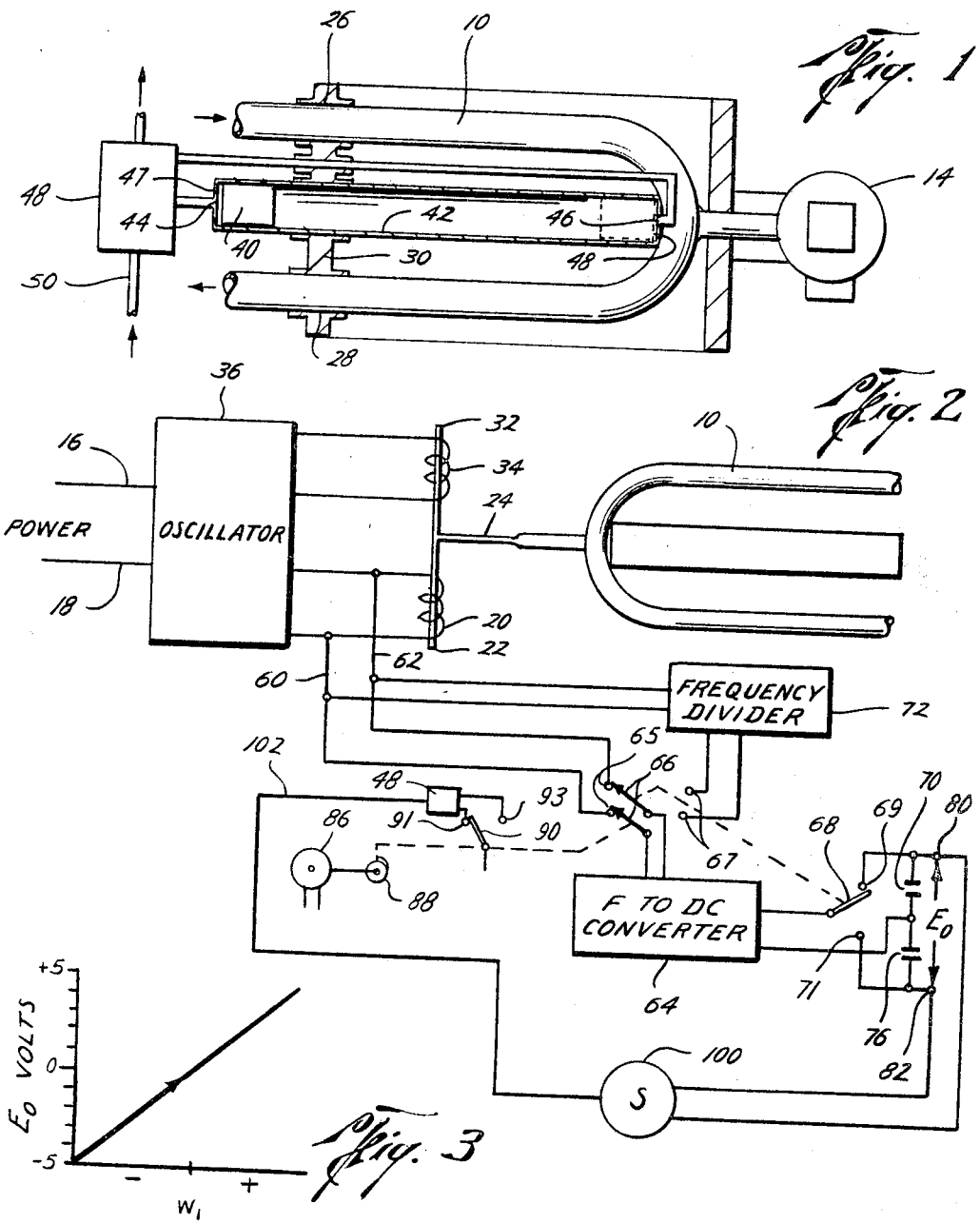

3,449,941
METHOD OF AND APPARATUS FOR MEASURING CHANGES IN THE MASS OF A FLUID ADAPTED TO CONTACT A VIBRATORY BODY
William B. Banks, Houston, Tex., assignor to Automation Products, Inc., Houston, Tex., a corporation of Texas
Filed Aug. 8, 1967, Ser. No. 659,212
Int. Cl. G01n 9/00
U.S. Cl. 73—32         11 Claims

ABSTRACT OF THE DISCLOSURE

An apparatus and method of measuring changes in the mass of a fluid adapted to contact a vibratory body by periodically adding and subtracting a weight to the body which is vibrated at its natural resonant frequency both before and after the change in weight and comparing the ratios of the natural resonant frequency before and after changing the weight so that the measurement is independent of environmental conditions. An apparatus and method of varying the position of the weight on the body until the natural resonant frequency ratio returns to its original value whereby the change in position of the weight is a measure of the change in mass of the fluid. An apparatus and method of measuring changes in the mass of fluid flowing through a vibrating U-shaped body by periodically changing the effective weight of the U-shaped body by a factor of four by adding and subtracting a weight in which the body is vibrated at its natural resonant frequency before and after changing the weight in which the larger resonant frequency is divided by a factor of two and the lower resonant frequency and the divided resonant frequency is converted to voltage signals which are compared to provide a measure of changes in the mass of the fluid.

Background of the invention

The present invention relates to a method of and apparatus for measuring changes in the mass or density of a fluid adapted to contact a vibratory body.

In general, vibratory measuring devices for measuring the mass or density of a flowable material are shown in my Patent Nos. 3,145,559 and 3,320,791, my copending patent application Ser. No. 381,610, now Patent No. 3,339,400 and my copending patent application Ser. No. 567,217. However, in some instances the modulus of elasticity of a vibratory body is subject to environmental changes, such as temperature and corrosion and changes in shape which affect the section moment of inertia, and thus such changes subject the measurement of said devices to error.

Summary

The present method and apparatus eliminates the effect of changes in the modulus of elasticity and changes in the dimension or shape of a vibratory body in the measurement of the mass or density of a fluid by periodically adding and subtracting a constant weight to the body and vibrating the body at its natural resonant frequency both before and after the change in weight so that the comparison of the ratios of the natural resonant frequencies before and after changing the weight will be dependent only upon substantially fixed quantities which are independent of environmental operating conditions.

It is a further object of the present invention to measure the changes in the mass of a fluid contacting vibratory body by noting when a change in the ratio of natural resonant frequencies occurs by varying the position of the weight on the body until the ratio returns to its original value whereby the change in position of the weight on the body is a measure of the change in mass of the fluid contacting the vibratory body.

The present invention is further directed to providing a method of an apparatus for measuring changes in the mass of a fluid flowing through a vibrating U-shaped body in which the effective weight of the vibratory body is periodically changed by a factor of four by adding and subtracting a weight to the body and the body is vibrated at its natural resonant frequency before and after changing the weight and the larger resonant frequency is divided by a factor of two and this divided frequency and the lower natural resonant frequency is converted to voltage signals so that a comparison of voltage signals is a measure of changes in the mass of the fluid flowing through the body.

The present invention further comprehends the measurement of the density of a fluid flowing through a U-shaped body adapted to vibrate about its legs by providing means for periodically changing the effective vibratory weight of the body a known amount thereby changing the natural resonant frequency at which the body and its contents will vibrate and including means for vibrating the body and its contents at its natural resonant frequency at all times and in which frequency divider means divides the natural resonant frequency at which the body and its contents without the added weight vibrates by a factor sufficient that the divided frequency will equal the natural resonant frequency with the added weight at a time when there is no change in the mass of the fluid contents of the body, and means for converting the divided resonant frequency and the lower resonant frequency to voltage signals, and means for comparing the resulting voltage signals whereby any change in the signals indicates a change in the density of the fluid.

Brief description of the drawings

In the attached drawing, like character references designate like parts throughout the several views in which:

FIGURE 1 is an elevational view, partly in cross-section, illustrating one structure of adding and subtracting a weight to a vibratory density measuring body, FIGURE 2 is an electrical and mechanical schematic view illustrating one embodiment of the present invention, FIGURE 3 is a graph illustrating the relationship of the density of the fluid being measured by the vibratory body and the electrical output from the device shown in FIGURE 2, and FIGURE 4 is a graph illustrating the relationship of the density of the fluid being measured by the vibratory body illustrated in FIGURES 1 and 2 and the position of the added weight.

While the present invention is applicable to various types of vibratory structures for measuring changes in the mass or density of a fluid such as disclosed in my Patent No. 3,145,559 and my copending patent application Ser. No. 567,217 the present invention will be described for purposes of illustration only in connection with a vibrating U-shaped body through which a fluid flows in which the density or mass of fluid is to be measured such as disclosed in my Patent No. 3,320,791 and my copending patent application Ser. No. 381,610.

Thus, referring to FIGURES 1 and 2, a U-shaped body 10 is provided through which the material being measured is contained or flowed and the body is vibrated and changes in the mass or density of the material in the body 10 affects the vibration of the body which will be an indication of the value or change of value of the mass or density of the material. Vibration means, which may be enclosed in housing 14 (FIGURE 1) may include, as best seen in FIGURE 2, power leads 16 and 18 which supply an electrical current from an external source to an oscillator 36 and to electrical magnetic coil 20 which attracts and releases an armature 22 connected to an arm 24 which is in turn connected to and vibrates a U-shaped body 10 about its legs at supports 26 and 28 from a base 30. A pickup armature 32 which is also connuected to the arm 24 vibrates with the U-shaped body 10 and generates an output signal in the detecting or pickup coil 34. Since the body 10 is to be vibrated at its natural resonant frequency at all times, the output from the detector coil 34 is fed to the oscillator 36 to provide feedback oscillation at the resonant frequency of the body 10 and its contents by connecting the oscillator output circuit to the electromagnetic drive coil 20. Thus, the body 10 will continue to operate at its natural resonant frequency, which frequency will change as the mass or density of the fluid in the body 10 changes, and the frequency of vibration is a measure of the mass or density of the material.

The basic equation for an oscillating spring body is as follows:

$$F^2 = KEI/W$$

where

F=natural resonant frequency,
E=modulus of elasticity,
I=section moment of inertia,
W=equivalent weight of the spring-like body about its point of vibration, and W includes $W_1$ (the weight of the material being measured) and $Wt$ (the tare weight of the vibrating body).

Ideally, the various factors in the above equation with the exception of the factor to be measured, $W_1$, remain constant. However, under certain environmental conditions the modulus of the elasticity, E, varies with temperature, and the moment of inertia, I, varies with corrosion or changes in its shape or dimension.

The present invention is directed to eliminating from the measurement of the measured factor, $W_1$, the factors of E and I by periodically adding a known weight to the body 10 and comparing the ratio of resonant frequencies before and after changing the weight.

That is, the natural resonant frequency $F_1$, without the added weight, is determined by the following equation:

$$F_1^2 = KEI/W \quad \text{(Equation 1)}$$

and the natural resonant frequency, $F_2$, at the time a weight, $W_a$, is added to the body is as follows:

$$F_2^2 = \frac{KEI}{W+W_a} \quad \text{(Equation 2)}$$

Dividing Equation 1 by Equation 2, the ratio of natural resonant frequency $F_1$ to $F_2$ is as follows:

$$\frac{F_1^2}{F_2^2} = \frac{W+W_a}{W} = 1 + \frac{W_a}{W} = 1 + \frac{W_a}{W_1+Wt}$$

(Equation 3)

From Equation 3, it is now noted that the ratios of the natural resonant frequency before and after adding a weight to the body 10 is determined by known factors of weight and the factors of E and I which are subject to variance due to environmental conditions are eliminated. Thus, so long as the factor to be measured, $W_1$, remains constant, the ratio of the natural resonant frequency $F_1$, before the weight $W_a$ is added, to the natural resonant frequency $F_2$ after the weight $W_a$ is added, remains constant, the ratio of frequencies $F_1/F_2$ will remain constant. However, if the mass of density of the material in the body 10 changes thus changing the factor $W_1$, the ratios of the natural resonant frequency $F_1/F_2$ will change and this change in the ratios will be a measure of the change in value of the mass or density of the material.

Referring now to FIGURE 1, a weight 40 is provided slidably enclosed in an air cylinder 42 having air inlets 44 and 46 at the ends 47 and 48 respectively of the cylinder 42 which are connected to an electrically actuated air valve 48 by which an air source (not shown) connected to conduit 50 is provided to the valve 48 for alternately supplying a soure of air to the inlets 44 and 46 for moving the weight 40 from one end to the second end of the cylinder 42. Thus, the weight 40 upon actuation of the valve 48 may be moved from the position shown in solid lines at end 47 to the dotted position where it is effectively added to the weight of the body 10 as $W_a$ when in the dotted position at end 48. Alternately the weight 40 is subtracted from the weight of the body 10 when it is positioned adjacent the cylinder end 47. Thus it is apparent that the weight 40 may be alternately added and subtracted to the vibrating body 10 thereby changing the natural resonant frequency of operation of the body 10.

While of course, any suitable means for measuring the ratios of the natural resonant frequencies before and after adding the weight 40 may be used, and while the weight 40 may be of any suitable amount, it is convenient, as hereinafter shown, for measurement purposes that the weight 40, $W_a$, be three times the weight W. If the added weight $W_a$, from Equation 3, is made three times the weight W then, the natural resonant frequency $F_2$ after adding the weight will be one-half the natural resonant frequency $F_1$ when the weight is subtracted. Then, a frequency comparison may be conveniently made by dividing the frequency $F_1$ by a factor of two so that it may be compared directly with $F_2$.

Thus one embodiment for measuring the ratios of natural resonant frequency is by providing a pair of leads 60 and 62 connected to the electromagnetic driving coil 20 which by the action of the feed back oscillator 36 is always driven at the natural resonant frequency of the body 10. The measurement of the frequency $F_2$ is transmitted directly to a frequency to DC converter 64 through a double acting switch 66, when switch 66 is in a first position contacting contact 65, where the frequency $F_2$ is converted to a DC voltage. The $F_2$ converted voltage from the converter 64 is transmitted through a double acting switch 68, when switch 68 is in a first position contacting contact 69, to a first condensor 70. Thus, the frequency $F_2$ by the proper actuation of switches 66 and 68 at the time that the weight 40 is added to the body 10 is converted to a DC a voltage signal which is applied to the condensor 70 which has a long time discharge constant so that the voltage on condensor 70 is a measure of the frequency $F_2$.

For measurement of the higher natural frequency $F_1$, a frequency divider 72, such as a conventional flip-flop circuit in the case where $F_1$ is to be divided by a factor of two, is connected to the leads 60 and 62 and to the frequency to DC converter 64 through the double acting switch 66 when the switch 66 is in its second position to divide the frequency $F_1$ by a factor such that $F_1$ may be conveniently compared to $F_2$. Thus, when the switch 66 is in its second position and engaging contacts 67, the frequency $F_1$ will be divided, transmitted to the converter 64 where the output from the converter 64 is transmitted through the double acting switch 68 which in its second position contacting contact 71 and will apply the output to a second condenser 76. Assuming that the weight 40 which was added tothe vibrating body 10 was three times as large as the weight W, the frequency $F_2$ would be one-half of the frequency $F_1$, but since the frequency of $F_1$ is divided by the frequency divider 72 by a factor of two, the output voltage transmitted by the converter 64 to the condensers 70 and 76 would be equal and the voltage output $E_0$ across the condensers 70 and 76 at terminals 80 and 82 would be zero so long as the weight, $W_1$, of the material to be measured remains constant. Therefore, so long as the ratio of $F_1$ to $F_2$ remains constant, the output $E_0$ from the terminals 80 and 82 will remain zero. However, as in the event that the mass or density of the material in or flowing through the U-shaped body 10 changes, the ratio of natural resonant frequencies, as noted by Equation 3, changes thereby causing a negative or positive change in the output voltage $E_0$ across the terminals 80 and 82 which is a measure of the change in the mass or density of the material being measured.

Referring to FIGURE 3, it is noted that the relationship between the output, $E_0$, in volts and the mass or density of the material being measured is substantially a straight line function and thus the voltage output $E_0$ increases or decreases from zero as the mass or density of the material, $W_1$, increases or decreases.

While the frequency divider 72 has been described as dividing the frequency $F_1$ by a factor of two under the assumpton that the weight $W_a$ was three times W for convenience of measurement, it is obvious that other frequency and weight ratios may be utilized for measuring and solving Equation 3 and comparing frequency ratios.

Referring now to FIGURE 2, the control mechanism for controlling the sequence of operation is best seen schematically wherein a motor 86 drives a cam 88 which is connected to a two-way switch 90 controlling the actuation of the electrically operated air valve 48, the two-way switch 66 previously described, and the two-way switch 68 previously mention. Thus the cam 88 alternately actuates switches 90, 66 and 68. In the position shown in FIGURE 2, switch 90 is in position at contact 91 to cause the weight 40 to be moved to the dotted position shown in FIGURE 1 thereby adding the weight 40, $W_1$, to the body 10. At the same time two-way switch 66 engages contact 65 where the natural resonant frequency $F_2$ at which the body, its material and weight 40 vibrate, is transmitted to the converter 64. At the same time, as shown, two-way switch 68 engages contact 69 whereby the output from the DC converter 64 which has converted frequency $F_2$ to a voltage signal is applied to and charges condenser 70.

In the alternate cycle, the cam 88 reverses the two-way switches 90, 66 and 68. Thus, switch 90 engages contact 93 to actuate the air valve 48 supplying air to the inlet 48 to one side of the weight 40 and exhausting air through inlet 44 through valve 48 to move the weight 40 away from end 48 and towards end 47 thereby subtracting the weight 40, $W_1$, from the body 10. Simultaneously switch 66 engages contact 67 so that the natural resonant frequency $F_1$ of the body 10 vibrating without the weight 40 flows through the frequency divider and to the converter 64 where it is converted to a DC voltage which is transmitted through the switch 68, which now engages contact 71, thereby charging the second condenser 76. This operation is continuous and thus the output across the terminals 80 and 82 provides an output $E_0$ which can be measured by any suitable meter, such as a voltage meter (not shown) which is in effect a measurement of the ratio of the frequency $F_1/F_2$. In the event the mass or density of the material in or flowing through the body 10 changes, the ratio $F_1/F_2$ will change thereby causing a voltage to appear across the output terminals 80 and 82 which is indicated by the graph in FIGURE 3 is a measurement of the value or change in value of the mass or density being measured of the material.

Another variation on the measurement of the ratios of the natural resonant frequency $F_1/F_2$ would be to provide means to automatically position the weight 40 so that the ratio of $F_1$ to $F_2$ remains constant and in that event the position of the weight 40 would be a function of the mass or density $W_1$ of the material flowing through the body 10. For example, a servomotor 100 may be provided connected to the output terminals 80 and 82 which thus receives a signal when the ratio of $F_1$ to $F_2$ changes and in turn provides a corrective signal through line 102 to the valve 48 to control the amount and direction of air which positions the weight 40 so as to position the weight 40 in the cylinder 42 at a position to maintain the frequency ratio constant. In this event the position of the weight 40 in the cylinder 42 would be a function of $W_1$, as indicated in the graph of FIGURE 4, and its position could be determined visually or by any conventional means.

The present invention, therefore, is well adapted to carry out the objects and attain the ends and advantages mentioned as well as others inherent therein. While presently preferred embodiments are given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. In the method of measuring changes in the mass of a fluid adapted to contact a vibratory body comprising:
   periodically adding and subtracting a constant weight to the vibratory body,
   vibrating the body at its natural resonant frequency both before and after the change in weight,
   comparing ratios at different times of the natural resonant frequencies before and after changing the weight whereby a change in the ratio indicates a change in the mass of the fluid contacting the vibratory body.

2. The method of claim 1 including:
   when a change in ratio of the natural resonant frequencies occurs, varying the position of the weight on the body until the ratio returns to its original value whereby the change in position of weight is a measure of the change in mass of the fluid contacting the vibratory body.

3. In the method of measuring changes in mass of the contents of a vibratory body adapted to hold fluid, the improvement comprising:
   vibrating the body and its contents at their natural resonant frequency,
   periodically changing the weight of the body a constant amount,
   vibrating the body and its contents with the changed weight at its new natural resonant frequency, and
   periodically comparing the natural resonant frequencies before and after changing the weight whereby a change in the ratio of different times of the resonant frequencies before and after changing the weight is a measure of the change in the mass of the contents of the body.

4. In the method of measuring density of a fluid adapted to flow through a vibrating U-shaped body, the improvement comprising:
   periodically vibrating the body and its contents at its natural resonant frequency,
   periodically adding and subtracting a constant weight to the U-shaped body,
   periodically vibrating the body with the changed weight at its new natural resonant frequency,
   comparing ratios at different times of the natural resonant frequencies of the body before and after changing the weight whereby changes in the ratio is a measure of changes in the density of the fluid flowing through the U-shaped body.

5. In the method of measuring changes in the mass of a fluid flowing through a vibrating U-shaped body, the improvement comprising:
   periodically changing the effective weight of the U-shaped body by a factor of four by adding and subtracting a weight to the body,
   vibrating the body and the flowing fluid at its natural resonant frequency before and after changing the weight,
   dividing the larger resonant frequency vibration by a factor of two,
   converting the lower natural resonant frequency and the divided resonant frequency into voltage signals, and
   comparing at different times the resulting voltage signals whereby variances in the comparison of voltage signals is a measure of changes in the mass of the flowing fluid.

6. In the method of measuring changes in the mass of a fluid flowing through a vibrating U-shaped body comprising:
   periodically vibrating the body and its contents at its natural resonant frequency,
   periodically changing the weight of the body a constant amount,
   periodically vibrating the body and its contents with the changed weight at its new natural resonant frequency,
   measuring the natural resonant frequencies before and after changing the weight,
   dividing the higher natural resonant frequency by a factor so it will equal the smaller resonant frequency at a time there is no change in the mass of the fluid contents of the body,
   periodically converting the measured lower natural resonant frequency and the divided resonant frequency into voltage signals, and
   periodically comparing the ratios of the resulting voltage signals thereby indicating changes in the mass of the fluid flowing through the body.

7. In an apparatus for measuring changes in the mass of a fluid adapted to contact a vibratory body, the improvement comprising:
   means for vibrating the body at its natural resonant frequency at all times,
   means connected to the body for periodically changing the weight of the body a constant amount, and
   means for measuring the natural resonant frequencies of vibration of the body before and after each changing of the weight.

8. The apparatus of claim 7 including:
   means for measuring the ratios at different times of the natural resonant frequencies before and after changing the weight which is a measure of a change in the mass of fluid contacting the vibratory body.

9. In an apparatus for measuring changes in the density of fluid flowing through a U-shaped body adapted to vibrate about its legs, the improvement comprising:
   means for vibrating the body and its contents at its natural resonant frequency at all times,
   means for periodically changing the effective vibratory weight of the body a known amount thereby changing the natural resonant frequency at which the body and its contents vibrate,
   frequency divider means dividing the natural frequency at which the body and its contents without the added weight vibrate by a factory sufficient that the divided frequency will equal the natural resonant frequency with the added weight at a time when there is no change in the mass of the fluid contents of the body,
   means for converting the divided natural resonant frequency and the lower resonant frequency to voltage signals, and
   means for comparing the ratios of the resulting voltage signals whereby any changes in the ratios indicates a change in the density of the fluid.

10. In an apparatus for measuring changes in the density of fluid flowing through a U-shaped body adapted to be vibrated about its supported legs, the improvement comprising:
    means for vibrating the body and its contents at its natural resonant frequency at all times,
    means for periodically changing the effective vibratory weight of the body and contents by a factor of four thereby changing the natural resonant frequency at which the body and its contents vibrate,
    means for dividing the natural resonant frequency of the body and its contents by a factor of two when the weight its substracted from the body,
    means for converting the divided frequency and the resonant frequency with the weight added to separate direct current voltages,
    a pair of condensers connected to the converting means and in series with each other, each of which receives one of the separate direct current voltages, and
    voltage measuring means connected across both condensers for measuring the voltage across the condensers.

11. In an apparatus for measuring changes in the mass of a fluid flowing through a U-shaped body adapted to vibrate about its legs, the improvement comprising:
    means for vibrating the body and its contents at its natural resonant frequency at all times,
    means for periodically changing the weight of the body a known amount thereby changing the natural resonant frequency at which the body and its contents vibrate,
    means for comparing the natural resonant frequencies of vibration of the body before and after changing the weight,
    means for positioning the added weight on the body at a position to keep the ratios of the natural resonant frequencies constant whereby the position of the added weight is an indication of the mass of fluid.

References Cited

UNITED STATES PATENTS

| 2,889,702 | 6/1959 | Brooking | 73—32 |
| 3,320,791 | 5/1967 | Banks | 73—32 |
| 3,339,400 | 9/1967 | Banks | 73—32 |

RICHARD C. QUEISSER, *Primary Examiner.*

J. K. LUNSFORD, *Assistant Examiner.*

U.S. Cl. X.R.

73—67.2